Aug. 16, 1966 B. ZUK 3,267,295

LOGIC CIRCUITS

Filed April 13, 1964 2 Sheets-Sheet 1

| | R | S | T | (1) | (0) |
|---|---|---|---|---|---|
| RESET | +V | 0 | +V | +V | 0 |
| SET | 0 | +V | +V | 0 | +V |

| | R | S | T | (1) | (0) |
|---|---|---|---|---|---|
| RESET | +V | 0 | 0 | +V | 0 |
| SET | 0 | +V | 0 | 0 | +V |

INVENTOR.
BORYS ZUK
BY John V. Regan
Attorney

| Row | $t_n-$ | | | | | $t_n$ | | $t_n+$ | | | | |
|---|---|---|---|---|---|---|---|---|---|---|---|---|
| | R | S | T | A | B | A | B | R | S | T | A | B |
| 1 | +V | 0 | 0 | +V | 0 | +V | 0 | +V | 0 | +V | +V | 0 |
| 2 | +V | 0 | 0 | +V | 0 | +V | 0 | 0 | +V | +V | 0 | 0 |
| 3 | 0 | +V | 0 | 0 | +V | 0 | +V | 0 | +V | +V | 0 | +V |
| 4 | 0 | +V | 0 | 0 | +V | 0 | +V | +V | 0 | +V | 0 | 0 |

INVENTOR.
BORYS ZUK
BY John V. Regan
Attorney

United States Patent Office 3,267,295
Patented August 16, 1966

3,267,295
LOGIC CIRCUITS

Borys Zuk, Somerville, N.J., assignor to Radio Corporation of America, a corporation of Delaware
Filed Apr. 13, 1964, Ser. No. 359,139
16 Claims. (Cl. 307—88.5)

This invention relates to logic circuits and, in particular, to new and improved logic circuits which employ transistors of opposite conductivity type.

Heat generated in electrical circuits usually is undesirable because of its aging effect on circuit components, its effect in changing the operating parameters and electrical characteristics of some components, and the resulting need and expense of providing cooling means in some cases. Moreover, the heat generated represents a power loss. The problem of heat generation is especially significant in integrated structures because of the small physical size of the circuitry and the close spacing of adjacent circuits.

It is one object of this invention to provide an improved gateable flip-flop that dissipates little or no power in the steady state and very little power during a switching transient.

It is another object of this invention to provide an improved flip-flop that has the characteristics aforementioned and in which information may be selectively entered on command.

It is still another object of this invention to provide improved shift type circuits, such as registers and ring counters, which require only one clock source and in which there is no "race" condition.

A further object of this invention is to provide a novel, clocked gate circuit that is immune, while being clocked, to changes in input signal conditions tending to change the output voltage in one polarity direction.

Circuits embodying the invention employ semiconductor devices each having a pair of electrodes defining a conduction path, and a control electrode for controlling the conductivity of the path. The semiconductor devices preferably are MOS or TFT field-effect transistors, to be described, in which case the pair of electrodes defining the conduction path are source and drain electrodes, and the control electrode is a gate electrode. Devices of one conductivity type have their conduction paths connected so as to provide a first circuit branch between a first point and a first output terminal, and a second circuit branch between the first point and a second output terminal. Devices of opposite conductivity type provide a third circuit branch between a second point and the first output terminal, and a fourth circuit branch between the second point and the second output terminal. Operating potential is applied across the first and second points. Two input terminals are provided for receiving information signals, and a third input terminal receives clock, or control signals. Connections between the input terminals and the control electrodes of the devices are such that there is no low impedance path between the first and second points for any operating condition of the circuit.

In the accompanying drawing, like reference characters denote like components; and FIGURE 1 is a schematic diagram of a gated flip-flop embodying the invention;

Figures 1, 2, 3, 4, 5:
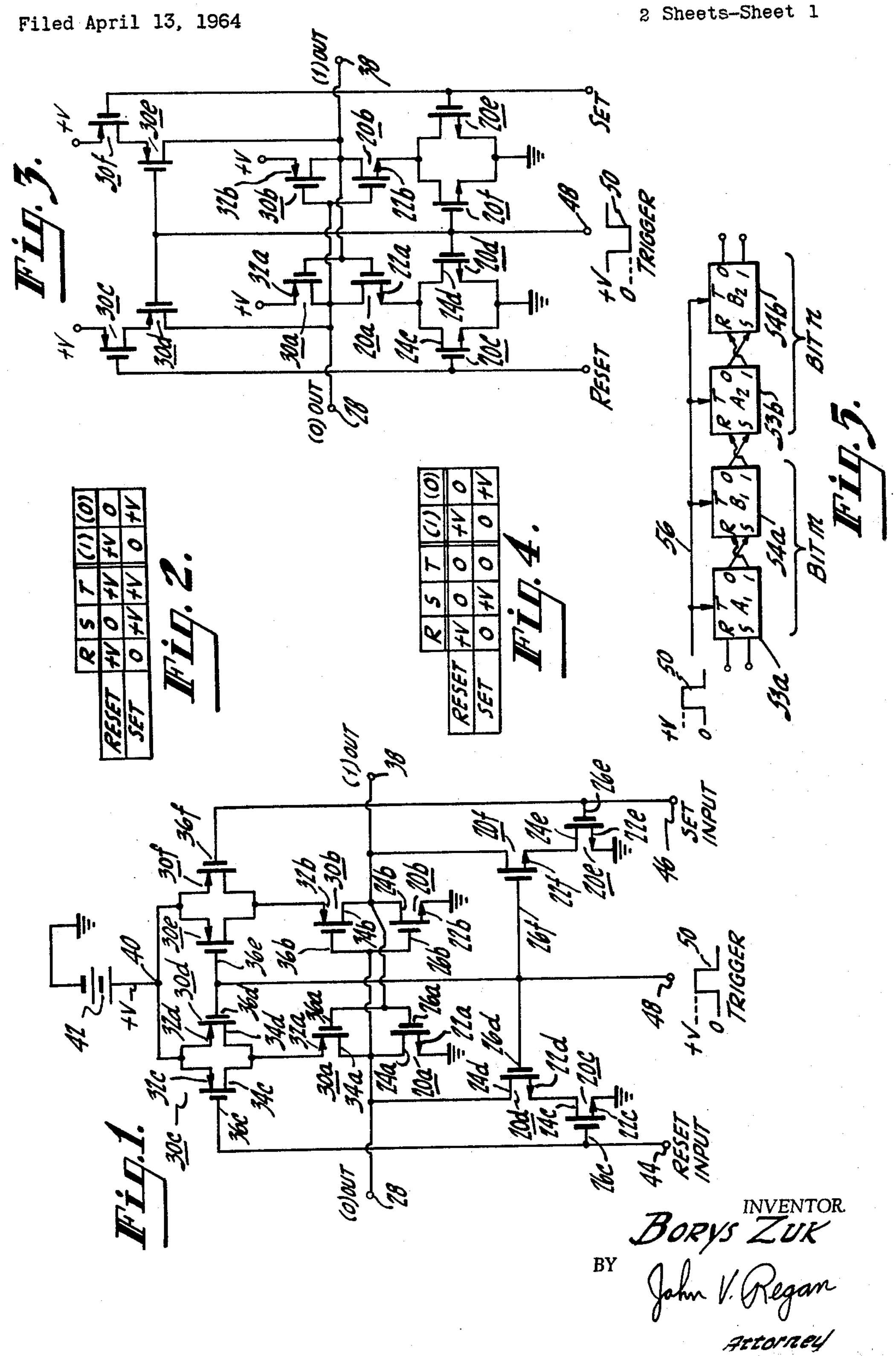
FIGURE 2 is a truth table for the flip-flop of FIGURE 1.
FIGURE 3 is a schematic diagram of another gated flip-flop embodying the invention.
FIGURE 4 is a truth table for the flip-flop of FIGURE 3.
FIGURE 5 is a block diagram which shows the manner in which the flip-flops of FIGURES 1 and 3 can be connected to perform a shift type circuit.

An insulated-gate field-effect transistor has characteristics that make the device particularly suitable for use in integrated circuitry. Such a transistor may be defined as a majority carrier field effect device that includes a semiconductor layer or wafer, with source and drain regions spaced from each other and contiguous to the semiconductor. The semiconductor provides a conduction path between the source and drain regions. A gate (control) electrode is separated by an insulating film from a portion of the semiconductor that lies between source and drain, and controls the conductivity (inverse of the resistance) of the conduction path. Since the gate electrode is insulated from the semiconductor, it does not draw any current, or at least it draws no appreciable current. For this reason the gate electrode of one transistor can be connected directly to the drain of another transistor, and there is little or no current flow through, or power dissipated in, the connection.

Two known types of insulated-gate field-effect transistors are the thin-film transistor (TFT) and the metal-oxide semiconductor (MOS). Some of the physical and operating characteristics of a TFT are described in the article "The TFT—A New Thin-Film Transistor," by P. K. Weimer, appearing at pages 1462–1469 of the June 1962 issue of the Proceedings of the IRE. The MOS transistor is described in an article entitled, "The Silicon Insulated-Gate Field-Effect Transistor," by S. R. Hofstein and F. P. Heiman, in the September 1963 issue of the Proceedings of the IEEE at pages 1190–1202.

Insulated-gate field-effect transistors may be of either the enhancement type or the depletion type. The enhancement type unit is of particular interest in the present application. In an enhancement type unit, the conductivity of the conduction path is low and only a small leakage current flows between source and drain when the gate and source have the same voltage. The transistor is biased "on" when the gate voltage differs from the source voltage in a specified polarity direction. The conductivity of the conduction path in an "on" transistor is a function of the voltage difference between source and gate.

A transistor may be either a P-type unit or an N-type unit, depending upon the conductivity type material of the semiconductor. A P-type unit is one in which the majority carriers are holes; in an N-type unit, the majority carriers are electrons. According to this definition, a P-type enhancement unit is one that has a relatively high conductivity conduction path when the gate voltage is negative relative to the source voltage; the N-type enhancement unit has a relatively high conductivity conduction path when its gate voltage is positive relative to its source voltage.

Because of the desirable characteristics of insulated-gate field-effect transistors, the circuit arrangements to be described are illustrated as employing such transistors. A P-type unit may be identified in the drawing by an arrowhead on the source lead pointing toward the unit. An N-type unit has an arrowhead on the source lead pointing away from the unit.

A clocked, gated or trigger type flip-flop circuit embodiment of the invention is illustrated schematically in FIGURE 1. The flip-flop, or bistable, portion of the circuit comprises a pair of N-type enhancement transistors 20*a*, 20*b* and a pair of P-type enhancement transistors 30*a*, 30*b*. N-type transistors 20*a* and 20*b* have their source electrodes 22*a* and 22*b* connected to a point of first operating potential, illustrated as circuit ground, and have their drain electrodes 24*a* and 24*b* connected respectively to a pair of output terminals 28 and 38. First output terminal 28 is labeled "(0) out"; second output terminal 38 is labeled "(1) out." The P-type transistors 30*a* and 30*b* have their drain electrodes 34*a* and 34*b* connected to the first and second output terminals 28 and 38, respectively, and to the drain electrodes 24*a* and 24*b*, respectively, of the N-type transistors 20*a* and 20*b*. The gate, or control, electrodes 26*a* and 36*a* of transistors 20*a* and 30*a*, respectively, are connected together and to the second output terminal 38. Gate electrodes 26*b* and 36*b* of transistors 20*b* and 30*b*, respectively, are connected together and to the first output terminal 28.

Third and fourth N-type enhancement transistors 20*c* and 20*d* have their conduction paths serially connected between circuit ground and the first output terminal 28. In particular, fourth transistor 20*d* has its drain electrode 24*d* connected to the output terminal 28 and has its source electrode 22*d* connected to the drain electrode 24*c* of third N-type transistor 20*c*. Third transistor 20*c* has its source electrode grounded. Fifth and sixth N-type enhancement transistors 20*e* and 20*f* have their conduction paths serially connected, in a similar manner, between circuit ground and the second output terminal 38.

Third and fourth P-type enhancement transistors 30*c* and 30*d* have their drain electrodes 34*c* and 34*d* connected together and to the source electrode 32*a* of transistor 30*a*. The source electrodes 32*c* and 32*d* of transistors 30*c* and 30*d* are connected together and to a point 40. In a similar manner, fifth and sixth P-type enhancement transistors 30*e* and 30*f* have their conduction paths connected in parallel between the source electrode 32*b* of transistor 30*b* and the point 40. Operating potential is applied between point 40 and the other common voltage point (circuit ground) by connecting a bias source of V volts, such as a battery 42, between point 40 and ground. Battery 42 is shown as having its positive terminal connected to the point 40 and having its negative terminal grounded, whereby the voltage at point 40 is +V volts relative to circuit ground.

Transistors 20*c* and 30*c* have their gate electrodes 26*c* and 36*c* connected to a RESET input terminal 44, and transistors 20*e* and 30*f* have their gate electrodes 26*e* and 36*f* connected to a SET input terminal 46. Transistors 20*d*, 20*f*, 30*d* and 30*e* have their gate electrodes 26*d*, 26*f*, 36*d* and 36*e* connected to a trigger, or clock, input terminal 48.

It will be noted that all of the various connections between the various transistors and between the transistors and the input and output terminals, etc., are direct connections in the sense that they are made by negligible impedance means. This is a distinct advantage when the circuit is fabricated in integrated form. Such direct connections are made possible by the fact that little or no current flows in the high impedance gate circuit of an insulated-gate field-effect transistor, and because there is never a low impedance path through the transistors between circuit ground and the +V volt source, as will be apparent as the description proceeds.

FIGURE 2 is a partial truth table for the flip-flop of FIGURE 1. As listed in the table, the voltage at second output terminal 38, the (1) output terminal, is +V volts when an input of +V volts is applied at the RESET input terminal 44 and a trigger pulse 50 of +V volts is applied concurrently at the trigger input terminal 48. The SET input voltage is zero at that time, assuming that the SET and RESET inputs are complementary, and the voltage at first output terminal 28 also is zero. The flip-flop may be considered to be in the RESET state and storing a binary "0" when these conditions exit. The flip-flop becomes SET to store a binary "1" when the voltage at the SET input terminal 46 is +V volts when the trigger pulse 50 is applied. The voltages at the (1) and (0) output terminals 38 and 28 then are zero and +V volts, respectively.

Consider now the operation of the flip-flop. Assume that the voltage at the trigger input terminal 48 is at ground potential, as is the case except when new information is to be gated into the flip-flop. Transistors 20*d* and 20*f* are biased "off" by the voltage at the trigger input terminal 48, and transistors 30*d* and 30*e* are biased "on." The conduction path of an "off" transistor has a very high impedance, on the order of megohms, for example, and the transistor can be considered an "open" circuit for practical purposes. The only current that flows through an "off" transistor is leakage current, and this current has a very small value, on the order of a few microamperes. Accordingly, there is very little current flow in the transistors 20*c*, 20*d*, 20*e* and 20*f*, and very little power dissipated therein when the trigger voltage is at ground potential.

Let it be assumed that the flip-flop is in the RESET state. This means that the voltage at the (1) output terminal 38 is +V volts. Transistor 20*a* is biased "on" by this voltage and the voltage at the (0) output terminal 28 is zero. Transistor 30*a* is biased "off" and presents an "open" circuit between output terminal 28 and the drain electrode 34*d* of transistor 30*d*. Thus, only leakage current flows through transistors 20*a*, 30*a* and 30*d* between circuit ground and the positive terminal of the battery 42, and very little power is dissipated.

With ground potential at output terminal 28, transistor 20*b* is biased "off" and transistor 30*b* is biased "on." Transistors 30*b* and 30*e* present a low impedance path between the (1) output terminal 38 and the positive terminal of the battery 42, whereby the voltage at output terminal 38 is +V volts. However, only leakage current flows through the "on" transistors 30*b* and 30*e* because the "off" transistor 20*b* presents an "open" circuit to ground. Also, as mentioned previously, an insulated-gate field-effect transistor has a very high input impedance due to the insulated gate. For this reason, little or no current is supplied from the output terminal 38 (or 28) to any transistors which are driven from these points.

The flip-flop may be switched from the RESET to the SET state by applying input voltages of +V volts and zero volts at the SET and RESET input terminals 46, 44, respectively, and applying a trigger or clock pluse 50 at trigger input terminal 48. An input of +V volts at the SET input terminal 46 biases transistor 20*e* "on" and biases transistor 30*f* "off." No switching occurs until a trigger pulse 50 is applied because transistors 20*d* and 20*f* are biased "off."

When a trigger pulse 50 is applied at terminal 48, transistor 20*f* is biased "on" and transistor 30*e* is biased "off." Transistors 20*e* and 20*f* present a low impedance path between circuit ground and the (1) output terminal 38, and drive the output voltage at that terminal to ground potential. Transistor 30*b* is "on" when the trigger pulse is first applied. Were it not for the transistors 30*e* and 30*f*, there would be a low impedance circuit path through transistors 20*e*, 20*f* and 30*b* between circuit ground and the positive terminal of battery 42, and a heavy current would flow through these transistors. Parallel transistors 30*e* and 30*f* prevent this condition since they are both biased "off" when the transistor 20*f* is biased "on." Therefore, there is no low impedance path between circuit ground and the positive terminal of battery 42.

With fast acting transistors, and especially those having turn-on thresholds, a transistor can be turned off as fast as, or faster than, an "off" transistor can be turned "on." Under these conditions, there is no low impedance path through transistors 20*e*, 20*f*, 30*b* and 30*e* or 30*f* even during the switching transient. Parasitic capacitances are charged or discharged during the switching transient, with a resulting small power dissipation in the transistors. However, the only other current that flows is leakage current.

When the voltage at the (1) output terminal 38 falls to ground potential, transistor 20*a* is biased "off" and transistor 30*a* is biased "on." Transistor 30*c* is "on" at this time because the voltage at the RESET input terminal 44 is at ground potential. Thus, there is a low impedance path through transistors 30*a* and 30*c* between the (0) output terminal 28 and point 40, whereby the voltage at terminal 28 rises to +V volts. This voltage is fed back to the gate electrode 26*b* of transistor 20*b* and turns this latter transistor "on." The voltage at the (1) output terminal 38 then remains at ground potential at the termination of the trigger pulse 50.

The flip-flop remains in the SET state until the voltages at the SET and RESET input terminals 46 and 44 are changed to zero and +V volts, respectively, and a trigger pulse 50 is applied. As mentioned previously, no switching can occur in the absence of a trigger input pulse 50 since transistors 20*d* and 20*f* are "off" and the voltage at an output terminal 28 or 38 cannot be driven from +V volts to ground potential. It follows also that no switching of the flip-flop can occur if the voltages at both the RESET and SET input terminals 44 and 46 are at ground potential, even in the presence of an applied trigger pulse 50, because both of the transistors 20*c* and 20*e* then are biased "off." Advantage is taken of this feature in an embodiment of the invention to be described hereinafter.

By way of summary of the above discussion, there is never a low impedance path through any combination of transistors between circuit ground and the positive terminal of battery 42 in a steady state circuit condition. Also, with fast transistors, especially those having a turn-on threshold, there is no low impedance path between circuit ground and the positive terminal of the battery 42 during a switching transient. The only current that flows through the transistors in the steady state is leakage current, and the power dissipated is, therefore, very low. During a switching transient, some additional current may flow through various ones of the transistors to charge and discharge parasitic capacitances.

FIGURE 3 is a schematic diagram of another gated flip-flop embodiment of the invention. In FIGURE 3, the transistors 20*c* and 20*d* are connected in parallel, and the source electrode 22*a* of transistor 20*a* is connected to the drain electrodes 24*c*, 24*d* of the transistors 20*c*, 20*d*, respectively. Transistors 20*e* and 20*f* also have their conduction paths connected in parallel and have their drain electrodes connected to the source electrode 22*b* of transistor 20*b*. The source electrodes 32*a*, 32*b* of transistors 30*a* and 30*b* are connected directly to a source of +V volts as indicated. Transistors 30*c* and 30*d* have their conduction paths connected in series between the +V volt source and the (0) output terminal 28. In a like manner, transistors 30*e* and 30*f* have their conduction paths connected in series between the +V volt source and the (1) output terminal 38. The other connections are the same as those in the FIGURE 1 circuit.

FIGURE 4 is a truth table for the flip-flop of FIGURE 3. By a comparison of this table with the table of FIGURE 2, it may be seen that from a functional or logic standpoint the only difference between the circuits of FIGURES 1 and 3 is that the FIGURE 3 circuit requires a trigger input of zero volts to enter new information into the flip-flop, whereas the FIGURE 1 flip-flop requires a trigger voltage of +V volts. Otherwise the operation of the flip-flops of FIGURES 1 and 3 is similar in concept. Advantage can be taken of the different triggering potentials of the two types of flip-flops to provide a relatively simple shift type arrangement.

Considering that a flip-flop of the type shown in FIGURE 1 is designated a type A flip-flop, and a flip-flop of the type shown in FIGURE 3 is designated a type B flip-flop, a two stage per bit shifting circuit requiring only one clock or trigger source may be provided in the manner illustrated in FIGURE 5. Odd numbered stages 53*a*, 53*b* of the shifting circuit, which may be a shift register, ring counter, or the like, comprise flip-flops of type A, and the even numbered stages 54*a*, 54*b* are of type B. Each of the stages has its (0) and (1) output terminals connected at the SET (S) and RESET (R) input terminals, respectively, of the next succeeding stage. The trigger (T) input terminals of all of the stages are connected to a common bus 56 and the bus, in turn, is connected to receive the clock or trigger pulses 50 from any suitable source (not shown).

Information is gated into a type A flip-flop when the clock pulse is at +V volts, as mentioned previously. Therefore, when the clock voltage rises from zero to +V volts, each type A flip-flop assumes the state of the next preceding type B flip-flop. When the clock voltage falls from +V volts to zero volts, new information is entered into the type B flip-flops, and each B flip-flop assumes the state of the next preceding type A flip-flop. There is no "race" condition in the shifting circuit, since the A flip-flops cannot change state when the clock voltage is zero volts and the B flip-flops cannot change state when the clock voltage is +V volts. Moreover, only a single clock pulse source is needed for shifting information, and no reactive elements are required. The circuit, therefore, is not repetition rate sensitive.

Figure 6:
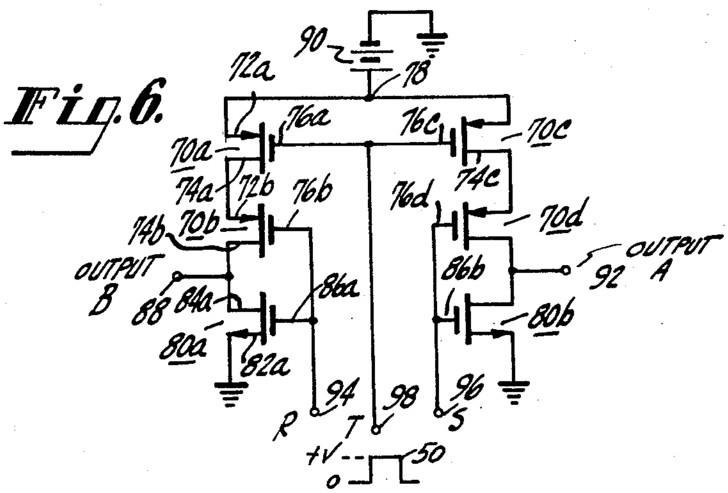
FIGURE 6 is a schematic diagram of a "blocking" gate.

In some cases, it is desirable to provide a shifting type circuit that has only one stage per bit of storage. As is known, some means must be provided between stages to provide interim storage and to prevent a race condition. A novel gate circuit which may be used in such a shifting type circuit is illustrated in FIGURE 6. The gating circuit of FIGURE 6 also has other uses.

The gate (gating circuit) comprises first and second P-type transistors 70*a* and 70*b* having their conduction paths connected in series between a point 78 and an output terminal 88, labeled "output B." First transistor 70*a* has its source electrode 72*a* connected directly to a point 78, and has its drain electrode 74*a* connected to the source electrode 72*b* of second transistor 70*b*. The drain electrode 74*b* is connected to the output terminal 88. A bias source of V volts, such as the battery 90, has its positive terminal connected at the point 78 and has its negative terminal connected to a point indicated as circuit ground. Third and fourth P-type transistors 70*c* and 70*d* are connected in a similar manner between the point 78 and a second output terminal 92, labeled "output A."

A first N-type unit 80*a* has its drain electrode 84*a* connected to the output terminal 88 and has its source electrode 82*a* connected to ground. A second N-type unit 80*b* is similarly connected between the second output terminal 92 and circuit ground.

The gate electrode 76*b* of transistor 70*b* and the gate electrode 86*a* of transistor 80*a* are connected directly together and to a REST input terminal 94. Gate electrode 76*d* of transistor 70*d* and control electrode 86*b* of transistor 80*b* are connected together and to a SET input terminal 96. The gate electrodes 76$a$ and 76$c$ of the remaining transisors 70$a$ and 70$c$ are connected together and to a trigger, or clock, input terminal 98. Clock pulses 50 are applied between the trigger terminal 98 and ground.

Figure 7:
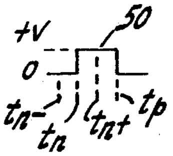
FIGURE 7 is a truth table for the blocking gate.

As will be seen as the discussion proceeds, the outputs A and B, in the absence of a clock pulse 50, are determined by the voltages applied at the R and S input terminals 94 and 96. These outputs do not change when the clock pulse is applied, provided that the R and S inputs do not change. If they do change, the A and B outputs during the clock period are determined by both the new R and S inputs and by the operating state of the circuit prior to the application of the clock pulse. As an aid to a better understanding of the circuit's characteristics, the "truth" table of FIGURE 7 lists the various voltage values as a function of time. The different time periods given in the table correspond to like-designated time periods shown for the clock input voltage to the right of the table. In particular, the clock pulse 50 is present during the period $t_n$ to $t_p$. The time $t_{n-}$ is prior to the beginning of the clock pulse, and $t_{n+}$ is a time after $t_n$ and before $t_p$.

Consider now the state of the circuit at $t_{n-}$ when the R and S inputs are +V volts and zero, respectively. The R input biases transistor 70$b$ "off" and biases transistor 80$a$ "on," and the output B is zero volts (rows 1 and 2, FIGURE 7). The S input biases transistor 80$b$ "off" and biases transistor 70$d$ "on." Transistor 70$c$ also is "on" at this time because of the ground potential at the trigger input terminal 98. Transistors 70$c$ and 70$d$ provide a low impedance path between the point 78 and the output terminal 92, whereby output A is +V volts (rows 1 and 2).

The clock pulse is applied at time $t_n$ and biases transistors 70$a$ and 70$c$ "off." The output B does not change because transistor 80$a$ is "on." In the right hand branch of the circuit, only the transistor 70$d$ is "on" when transistor 70$c$ turns "off." The charge stored in transistor 70$d$ and in the parasitic capacitance between output terminal 92 and circuit ground maintains output A at +V volts because the transistors 70$c$ and 80$b$ are high impedance leakage paths. Some of this charge would leak off if the clock pulse were of long enough duration. However, it has been found that there is no perceptible change in the output A voltage under these conditions for a clock pulse of several microseconds duration. Thus, if the R and S inputs do not change while the clock pulse is being applied, the A and B outputs do not change at time $t_{n+}$ (row 1).

Consider now the effect of reversing the R and S inputs at $t_{n+}$. The S input now is +V volts, transistor 80$b$ is biased "on," and the output A voltage falls to ground potential (row 2). The R input goes from +V volts to ground potential and biases "off" transistor 80$a$ and biases "on" transistor 70$b$. Transistor 70$a$ is "off" because of the clock voltage. Transistor 70$a$ presents a high impedance "open" circuit path between the terminal 88 and the positive terminal of the battery 90. Transistor 80$a$ presents an "open" circuit between output terminal 88 and ground. Accordingly, there is very little current flow through these paths to charge or discharge the charge stored in previously "on" transistor 80$a$ and the parasitic capacitance between output terminal 88 and ground, whereby output B remains at ground potential (row 2). It is seen that the effect of changing the R and S input voltages is to change the output A from +V volts to ground potential.

By similar analysis it can be shown that output A is at ground potential and output B is at +V volts at $t_{n-}$ when the R and S input voltages are zero and +V volts, respectively (rows 3 and 4), and that the A and B outputs do not change at $t_{n+}$ if the R and S inputs do not change (row 1). It can also be shown that the output B voltage falls from +V volts to ground potential if the R and S inputs change from zero and +V to +V and zero, respectively, at $t_{n+}$ (row 4). A comparison of the A and B outputs at $t_{n-}$ with the A and B outputs at $t_{n+}$ indicates that an output voltage A or B can fall from +V volts to zero while the clock pulse is applied, but that an output voltage cannot rise from zero to +V volts. Advantage may be taken of this characteristic of the gate to provide a one stage per bit shift circuit.

It will be recalled from the description of the FIGURE 1 flip-flop that the flip-flop is only subject to being switched when a clock pulse is applied. It will also be recalled from that description that once the flip-flop switches, both the RESET and SET inputs can change to ground potential, even during the clock period, without affecting the status of the flip-flop. These characteristics of the flip-flop are compatible with those of the gate, and the two circuits can be connected as shown in FIGURE 8 to form a shift register, ring counter, and the like.

Figure 8:
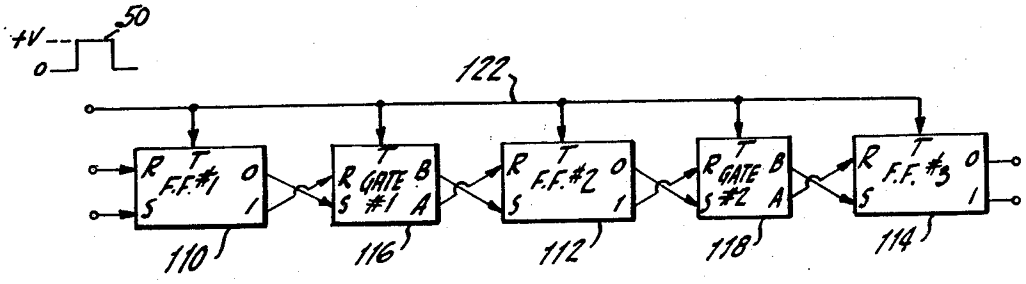
FIGURE 8 is a block diagram of a shift circuit arrangement employing gated flip-flops and blocking gates.

In the block diagram of FIGURE 8, three flip-flops 110, 112 and 114 are illustrated. A first gate 116 has its R and S input terminals connected to the (1) and (0) output terminals, respectively, of first flip-flop 110, and has its A and B output terminals connected to the R and S input terminals of the second flip-flop 112. A second gate 118 is similarly connected between the output terminals of the second flip-flop 112 and the input terminals of the third flip-flop 114. All of the flip-flops and gates have their trigger (T) terminals connected to a common bus 122 to which clock pulses 50 (or shift pulses, etc.) are applied.

Each of the flip-flops 110, 114 stores a binary bit "1" or "0" in the steady state, that is, absent a clock pulse 50. In the steady state, the outputs of gates 116 and 118 are determined by the outputs of flip-flops 110, 112, respectively. Accordingly, when a clock pulse 50 is applied, second flip-flop 112 assumes the pre-clock state of first flip-flop 110, and third flip-flop 114 assumes the pre-clock state of second flip-flop 112.

The outputs of a flip-flop, second flip-flop 112 for example, change if the state of the flip-flop changes. Moreover, the change in outputs may occur before the clock pulse terminates. In the latter event, the outputs of the next succeeding gate 118 will both be zero volts (rows 2 and 4, FIGURE 7) after the change. Before the outputs reach this value, however, the following flip-flop 114 will have switched, if switching is called for by the pre-clock inputs thereto, or will at least be in the process of switching. As mentioned previously in describing the flip-flop, both inputs to a flip-flop can become zero volts, after switching commences, without affecting the flip-flop. The condition that cannot be tolerated is for both inputs to a flip-flop to be +V volts when the clock pulse is present, and this condition cannot exist here due to the gate characteristics. Due to the gate characteristics, therefore, a flip-flop is rendered insensitive to changes in the state of the preceding flip-flop during the presence of a suitable clock pulse. Also, a flip-flop cannot be switched after the clock pulse terminates. It is thus seen that there can be no "race" condition in the shift circuit arrangement.

What is claimed is:

1. The combination comprising:

first and second output terminals;

first and second semiconductor amplifying devices of one conductivity type and a third semiconductor amplifying device of the opposite conductivity type, each of the devices having first and second electrodes defining a conduction path, and a control electrode for controlling the conductivity of the path;

means connecting the second electrode of the first device to the first electrode of the second device;

means connecting the second electrode of the second device and the second electrode of the third device to each other and to the first output terminal;

fourth and fifth semiconductor amplifying devices of the first conductivity type and a sixth semiconductor amplifying device of the opposite conductivity type;
means connecting the second electrode of the fourth device to the first electrode of the fifth device;
means connecting the second electrodes of the fifth and sixth devices to each other and to the second output terminal;
means for applying input signals from a first source at the control electrode of the third device and at the control electrode of one of the first and second devices;
means for applying input signals from a second source at the control electrode of the sixth device and at the control electrode of one of the fourth and fifth devices;
means for applying input signals from a third source at the control electrode of the other one of the first and second devices and at the other one of the fourth and fifth devices; and
means for applying operating potential between the first electrodes of the first and third devices, and between the first electrodes of the fourth and sixth devices.

2. The combination as claimed in claim 1, wherein each of the devices is an insulated-gate field-effect transistor.

3. The combination comprising:
first and second semiconductor amplifying devices of one conductivity type and a third semiconductor amplifying device of the opposite conductivity type, each of the devices having a conduction path and a control electrode;
means connecting the conduction paths of the first, second, and third devices in a first series combination;
fourth and fifth semiconductor amplifying devices of said one conductivity type and a sixth semiconductor amplifying device of the opposite conductivity type;
means connecting the conduction paths of the fourth, fifth and sixth devices in a second series combination;
means for applying operating potential across the first series combination and across the second series combination;
a first input terminal connected to the control electrode of the third device and to the control electrode of one of the first and second devices;
a second input terminal connected to the control electrode of the sixth device and to the control electrode of one of the fourth and fifth devices; and
a third input terminal connected to the control electrodes of the other one of the first and second devices and the other one of the fourth and fifth devices.

4. The combination as claimed in claim 1, including first and second bistable stages each having set and reset input terminals and a pair of output terminals, means connecting each of the pair of output terminals of the first bistable stage to a different one of the first and second input terminals, and means connecting each of said first and second output terminals to a different one of the set and reset input terminals of the second bistable stage.

5. The combination comprising:
first and second output terminals;
first semiconductor amplifying means of one conductivity type having an input electrode, an output electrode connected to the first output terminal, and having first and second control electrodes;
second semiconductor amplifying means of the opposite conductivity type having an output electrode connected to the first output terminal, an input electrode, and a control electrode connected by negligible impedance means to the second control electrode of the first amplifying means;
third semiconductor amplifying means of said one conductivity type having an input electrode, an output electrode connected to the second output terminal, a first control electrode connected by negligible impedance means to the first control electrode of the first semiconductor amplifying means, and a second control electrode;
fourth semiconductor amplifying means of said opposite conductivity type having an input electrode, an output electrode connected to the second output terminal, and a control electrode connected by negligible impedance means to the second control electrode of the third amplifying means; and
means for applying operating potential between the input electrodes of the first and second amplifying means, and between the input electrodes of the third and fourth amplifying means.

6. The combination as claimed in claim 5, wherein all of the semiconductor amplifying means are insulated-gate field-effect transistor means, and including: means for connecting a first source of input signals in common to the control electrode of the second amplifying means and to the second control electrode of the first amplifying means; means for connecting a second source of input signals in common to the control electrode of the fourth amplifying means and to the second control electrode of the third amplifying means; and means for connecting a third source of signals in common to the first control electrodes of the first and third amplifying means.

7. The combination comprising:
first and second junction points;
first and second output terminals;
first, second, third and fourth transistors of one conductivity type, each transistor having first and second electrodes defining a conduction path, and having also a control electrode;
means connecting the conduction paths of the first and second transistors in series between the first junction point and the first output terminal;
means connecting the conduction paths of the third and fourth transistors in series between the first junction point and the second output terminal;
a fifth transistor of opposite conductivity type having its conduction path connected between the second junction point and the first output terminal;
a sixth transistor of said opposite conductivity type having its conduction path connected between the second junction point and the second output terminal;
a first input terminal common to the control electrodes of the second and fifth transistors;
a second input terminal common to the control electrodes of the fourth and sixth transistors; and
a third input terminal common to the control electrodes of the first and third transistors.

8. The combination comprising:
first and second output terminals;
first, second, third, fourth, fifth and sixth transistors of one conductivity type and seventh, eight, ninth, tenth, eleventh and twelfth transistors of the opposite conductivity type, each transistor having source, drain and gate electrodes;
means coupling (1) the drain electrodes of the first and seventh transistors to each other and to the first output terminal, (2) the drain electrodes of the second and eighth transistors to each other and to the second output terminal, (3) the gate electrodes of the first and seventh transistors to each other and in common to the drain electrodes of the second and eighth transistors, and (4) the gate electrodes of the second and eighth transistors to each other and in common to the drain electrodes of the first and seventh transistors;
means connecting the source electrodes of the third and fourth transistors to each other, and connecting their drain electrodes to each other and to the source electrode of the first transistor;
means connecting the source electrodes of the fifth and sixth transistors to each other, and connecting their drain electrodes to each other and to the source electrode of the second transistor;

means connecting the drain electrodes of the ninth and eleventh transistors to the source electrodes of the tenth and twelfth transistors, respectively;

means connecting the drain electrodes of the tenth and twelfth transistors to the first and second output terminals, respectively;

a first input terminal connected in common to the gate electrode of the third transistor and the gate electrode of one of the ninth and tenth transistors;

a second input terminal connected in common to the gate electrode of the sixth transistor and the gate electrode of one of the eleventh and twelfth transistors;

a third input terminal connected in common to the gate electrodes of the fourth and fifth transistors, the gate electrode of the other one of the ninth and tenth transistors, and the gate electrode of the other one of the eleventh and twelfth transistors; and means for applying operating potential (1) between a point common to the source electrodes of the third and fourth transistors and a point common to the source electrodes of the seventh and ninth transistors, and (2) between a point common to the source electrodes of the fifth and sixth transistors and a point common to the source electrodes of the eighth and eleventh transistors.

9. The combination as claimed in claim 8, wherein all of the transistors are insulated-gate field-effect transistors.

10. The combination as claimed in claim 8, wherein said combination is a flip-flop, and wherein said first, second, and third input terminals are connected to receive reset, set and control input signals, respectively.

11. The combination comprising:

first and second points;

first and second output terminals;

first, second, third, fourth, fifth and sixth semiconductor amplifying devices of one conductivity type, each device having first and second electrodes defining a conduction path, and having also a control electrode;

means connecting the conduction paths of the third and fourth devices in parallel with each other and in series with the conduction path of the first device, in that order, between the first point and the first output terminal;

means connecting the conduction paths of the fifth and sixth devices in parallel with each other and in series with the conduction path of the second transistor, in that order, between the first point and the second output terminal;

seventh, eighth, ninth, tenth, eleventh and twelfth semiconductor amplifying devices of the opposite conductivity type;

means connecting the conduction paths of the seventh and eighth devices between the second point and the first and second output terminals, respectively;

means connecting the conduction paths of the ninth and tenth devices in series between the second point and the first output terminal;

means connecting the conduction paths of the eleventh and twelfth devices in series between the second point and the second output terminal;

means connecting the control electrodes of the first and seventh devices to each other and to the second output terminal;

means connecting the control electrodes of the second and eighth devices to each other and to the first output terminal;

a first input terminal common to the control electrodes of the third and ninth devices;

a second input terminal common to the control electrodes of the sixth and eleventh devices; and a third input terminal common to the control electrodes of the fourth, fifth, tenth and twelfth devices.

12. The combination as claimed in claim 11, wherein all of the amplifying devices are insulated-gate field-effect transistors, and including means for applying operating potential across the first and second points.

13. The combination as claimed in claim 12, wherein all of the recited connections between the transistors are by way of negligible impedance means.

14. The combination as claimed in claim 12, wherein the combination is a flip-flop, and wherein reset and set input signals are applied at the first and second input terminals, respectively, and control signals are applied at the third input terminal.

15. The combination comprising:

a plurality of bistable storage stages and a plurality of gate means interconnecting the storage stages in a cascaded chain;

each of the storage stages including: first and second output terminals; first, second, third, fourth, fifth and sixth transistors of one conductivity type, and seventh, eighth, ninth, tenth, eleventh and twelfth transistors of the opposite conductivity type, each transistor having first and second electrodes defining a conduction path, and a control electrode; first and second points of different operating potential; means connecting the conduction paths of the third and fourth transistors in parallel with each other and in series with the conduction path of the first transistor, in that order, between the first point and the first output terminal; means connecting the conduction paths of the fifth and sixth transistors in parallel with each other and in series with the conduction path of the second transistor, in that order, between the first point and the second output terminal; means connecting the conduction paths of the seventh and eighth transistors between the second point and the first and second output terminals, respectively; means connecting the control electrodes of the first and seventh transistors to each other and to the second output terminal; means connecting the control electrodes of the second and eighth transistors to each other and to the first output terminal; means connecting the conduction paths of the ninth and tenth transistors in series between the second point and the first output terminal; and means connecting the conduction paths of the eleventh and twelfth transistors in series between the second point and the second output terminal;

each gate means including two points of different operating potential; first and second transistors of one conductivity type and a third transistor of the opposite conductivity type having their conduction paths connected in a series chain, in the order named, between said two points, with a point on the chain between the second and third transistors being connected to the control electrodes of the sixth and eleventh transistors in the next succeeding storage stage; fourth and fifth transistors of said one conductivity type and a sixth transistor of the opposite conductivity type having their conduction paths connected in a series chain, in the order named, between the said two points, with a point on the chain between the fifth and sixth transistors being connected to the control electrodes of the third and ninth transistors in the next succeeding storage stage;

means connecting the first output terminal of a storage stage to the control electrode of said sixth transistor and to the control electrode of one of the fourth and fifth transistors in the next succeeding gate means;

means connecting the second output terminal of a storage stage to the control electrode of the third transistor and to the control electrode of the one of the first and second transistors in the next succeeding gate means;

means connecting the control electrode of the other one of the first and second transistors in each gate means, the control electrode of the other one of the fourth and fifth transistors in each gate means, and the control electrodes of the fourth, fifth, tenth and twelfth transistors in each storage stage to a common terminal; and means for applying control signals selectively at said common terminal.

16. The combination as claimed in claim 15, wherein all of the transistors are insulated-gate field-effect transistors, and wherein all of the recited connections are direct current connections of negligible impedance.

No references cited.

ARTHUR GAUSS, *Primary Examiner.*

I. C. EDELL, *Assistant Examiner.*